(12) United States Patent
He

(10) Patent No.: US 11,422,323 B2
(45) Date of Patent: Aug. 23, 2022

(54) OPTICAL COMMUNICATION MODULE MANUFACTURABLE OTHER THAN IN A VACUUM AND METHOD OF MANUFACTURE THEREOF

(71) Applicant: SHUNSIN TECHNOLOGY (ZHONG SHAN) LIMITED, Zhongshan (CN)

(72) Inventor: Guang-Sheng He, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 143 days.

(21) Appl. No.: 16/944,520

(22) Filed: Jul. 31, 2020

(65) Prior Publication Data

US 2021/0149130 A1 May 20, 2021

(30) Foreign Application Priority Data

Nov. 14, 2019 (CN) .......................... 201911112138.X

(51) Int. Cl.
| | |
|---|---|
| G02B 6/42 | (2006.01) |
| H04B 10/60 | (2013.01) |
| H04B 10/40 | (2013.01) |
| H04B 10/25 | (2013.01) |
| H04B 10/50 | (2013.01) |

(52) U.S. Cl.
CPC ........... *G02B 6/4251* (2013.01); *G02B 6/428* (2013.01); *G02B 6/4277* (2013.01); *H04B 10/25* (2013.01); *H04B 10/40* (2013.01); *H04B 10/50* (2013.01); *H04B 10/60* (2013.01); *G02B 6/4269* (2013.01); *G02B 6/4286* (2013.01)

(58) Field of Classification Search
None
See application file for complete search history.

(56) References Cited

U.S. PATENT DOCUMENTS

| | | | | |
|---|---|---|---|---|
| 6,220,764 | B1 * | 4/2001 | Kato | G02B 6/4204 264/1.25 |
| 6,910,812 | B2 * | 6/2005 | Pommer | G02B 6/4201 385/24 |
| 7,248,768 | B2 * | 7/2007 | Jeon | G02B 6/4214 385/47 |
| 7,306,377 | B2 * | 12/2007 | Ellison | G02B 6/4246 385/88 |

(Continued)

FOREIGN PATENT DOCUMENTS

| | | |
|---|---|---|
| CN | 101499461 A | 8/2009 |
| CN | 102520491 A | 6/2012 |

(Continued)

*Primary Examiner* — Jerry Rahll
(74) *Attorney, Agent, or Firm* — ScienBiziP, P.C.

(57) ABSTRACT

An optical communication module made with transparent packaging material which locates elements and provides protection against contaminants and EMI includes a printed circuit board; a photoelectric element disposed on the printed circuit board; an optical-fiber connector disposed on the printed circuit board, corresponding to the photoelectric element; the transparent packaging material covers the printed circuit board, the photoelectric component and the optical-fiber connector. An electromagnetic shielding layer covers the transparent packaging material. A method of manufacturing same is also disclosed.

8 Claims, 8 Drawing Sheets

(56) References Cited

U.S. PATENT DOCUMENTS

| | | | |
|---|---|---|---|
| 8,469,606 B2 | 6/2013 | Becht | |
| 2003/0201462 A1* | 10/2003 | Pommer | G02B 6/4259 257/200 |
| 2005/0244095 A1* | 11/2005 | Ellison | G02B 6/4246 385/14 |
| 2005/0245103 A1* | 11/2005 | Ellison | G02B 6/4246 439/61 |
| 2007/0077008 A1* | 4/2007 | Jeon | G02B 6/4214 385/39 |
| 2021/0149130 A1* | 5/2021 | He | G02B 6/428 |

FOREIGN PATENT DOCUMENTS

| | | |
|---|---|---|
| CN | 103021972 A | 4/2013 |
| CN | 202886656 U | 4/2013 |
| CN | 206546452 U | 10/2017 |
| CN | 107861197 A | 3/2018 |
| CN | 109387910 A | 2/2019 |
| TW | 201027155 A | 7/2010 |
| TW | I561878 B | 12/2016 |

* cited by examiner

OPTICAL COMMUNICATION MODULE MANUFACTURABLE OTHER THAN IN A VACUUM AND METHOD OF MANUFACTURE THEREOF

FIELD

The subject matter herein generally relates to optical communication modules having transparent packaging materials and the manufacturing method thereof.

BACKGROUND

An optical communication network has the characteristics of low transmission loss, high data confidentiality, immunity to EMI, and wide bandwidth, and is a main communication method today. The optical communication module is an important basic component in optical communication technology. The optical communication module is used to receive optical signals from an optical network and convert the optical signals into electrical signals. The optical communication module can also convert electrical signals into optical signals, and then transmit the optical signals outward through the optical network.

In order to improve the service life and the reliability of signals of the optical communication module, the conventional optical communication module is assembled in a vacuum. The optical communication module, the printed circuit board, and the electronic and optical components are sealed in a metal housing to keep the inside of the metal housing in a vacuum, thereby preventing the electronic and optical components from deteriorating due to the erosion of moisture and dust, etc. However, it has led to an increase in manufacturing cost.

Moreover, a vacuum environment makes it difficult to weld an optical fiber connector to the metal shell, and align the optical fiber with the optical component.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
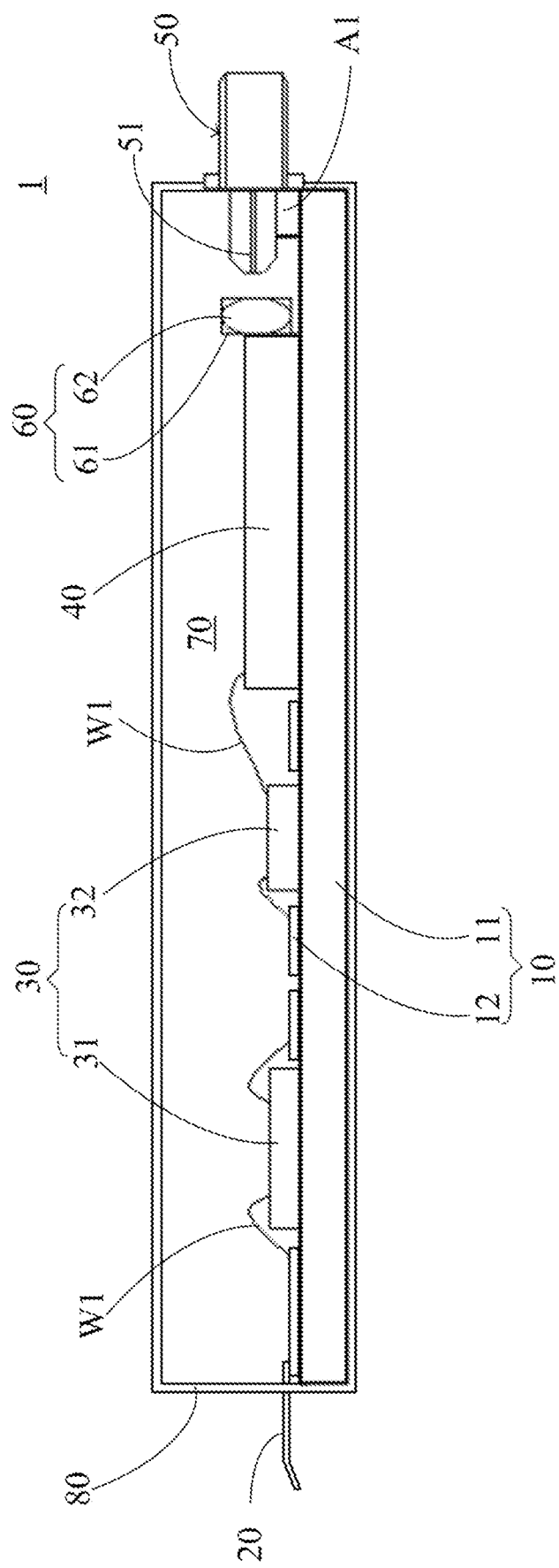
FIG. 1 is a schematic view of an optical communication module in accordance with a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connected" is directly or indirectly through intervening components and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a schematic view of an optical communication module 1 in accordance with a first embodiment of the present disclosure. The optical communication module 1 is configured to be mounted in an electronic device, so that the electronic device can receive and/or transmit optical signals. The electronic device may be a computer, server, or router, but it is not limited thereto. The optical communication module 1 may be an optical receiving module, an optical transmitting module, or an optical transceiver module. The optical receiving module may receive optical signals, and convert optical signals to electrical signals. The optical transmitting module may receive electrical signals from the electronic device and convert the electrical signals to optical signals. The optical signals may be transmitted out via optical fiber 51. In addition, the optical transceiver module can integrate the functions of the optical receiving module and optical transmitting module and can be used to receive and transmit optical signals.

Figure 2:
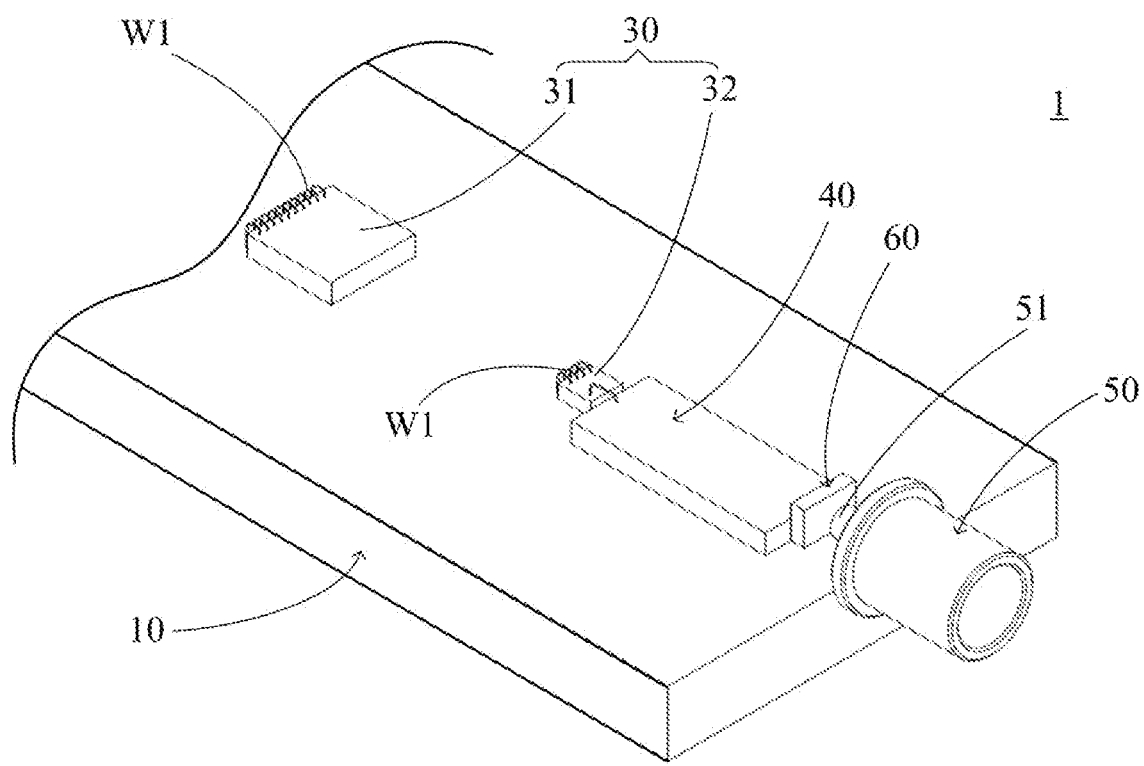
FIG. 2 is a perspective view of the optical communication module of FIG. 1, some components being omitted.

FIG. 2 is a perspective view of the optical communication module 1 of FIG. 1. For the purpose of clarity, some components are omitted in FIG. 2. In the embodiment, the optical communication module 1 is an optical transmitting module, but it is not limited thereto. The optical communication module 1 may include a printed circuit board 10, a signal wire 20, a number of chips 30, a photoelectric element 40, an optical-fiber connector 50, a lens assembly 60, a transparent packaging material 70, and an electromagnetic shielding layer 80. The printed circuit board 10 may be a rigid printed circuit board (rigid PCB or RPC). The printed circuit board 10 includes an insulated substrate 11 and a circuit layer 12. The insulated substrate 11 may be made of thermally conductive material and may be made of rigid materials. In the embodiment, the insulated substrate 11 may be a ceramic substrate, but it is not limited thereto. The circuit layer 12 is disposed on the insulated substrate 11 and is made of conductive materials. In the embodiment, the thickness of the insulated substrate 11 is greater than three times thicker than the circuit layer 12. The thickness of the insulated substrate 11 and the thickness of the circuit layer 12 are measured in the same direction.

One end of the signal wire 20 is connected to the circuit layer 12 of the printed circuit board 10, and the other end of the signal wire 20 is connected to the main board of the electronic device (not shown in figures). In some embodiments, the signal wire 20 may be a flexible printed circuit (FPC). The signal wire 20 can be connected to the circuit layer 12 and/or the main board by soldering. In some embodiments, the signal wire 20 can be connected to the circuit layer 12 and/or the main board via an electrical connector (not shown in figures).

The chips 30 are disposed on the top surface of the printed circuit board 10. In the embodiment, the chips 30 are mounted on the printed circuit board 10 by chip-on-board (COB) package. The chips 30 can adhere to the insulated substrate 11, and be electrically connected to the circuit layer 12 via the wire W1.

In the embodiment, the chips 30 include a control chip 31 and a monitor photodiode (MPD) chip 32, but not being limited thereto. The control chip 31 is used to drive the photoelectric element 40. In the embodiment, the control chip 31 can drive the photoelectric element 40 according to electrical signals to emit light beams with optical signals. The monitor photodiode chip 32 is used to detect conditions and states, such as power level, of the light beams generated by the photoelectric element 40.

The photoelectric element 40 is disposed on the top surface of the printed circuit board 10. In the embodiment, the photoelectric element 40 adheres to the insulated substrate 11, and the photoelectric element 40 is electrically connected to the circuit layer 12 and the monitor photodiode chip 32 via the wire W1. In the embodiment, the photoelectric element 40 is an optical-signal transmitter, that is configured to emit light beams with optical signals. The optical-signal transmitter may be a distributed feedback laser (DFB Laser), that is configured to emit laser. In some embodiments, the optical-signal transmitter is a light emitting diode (LED), as a light source.

The optical-fiber connector 50 is disposed on the top surface of the printed circuit board 10 and corresponds to the photoelectric element 40. The optical-fiber connector 50 includes optical fiber 51. The end surface of the optical fiber 51 faces the lens assembly 60 and the photoelectric element 40. The optical-fiber connector 50 and the signal wire 20 are on opposite sides of the printed circuit board 10. In the embodiment, the optical communication module 1 further includes an adjustable base A1 between the printed circuit board 10 and the optical-fiber connector 50.

The lens assembly 60 is between the photoelectric element 40 and the optical-fiber connector 50. The lens assembly 60 includes a lens holder 61 and a lens 62. The lens holder 61 of the lens assembly 60 adheres to a luminous surface of the optical-signal transmitter (photoelectric element 40). The lens 62 may be a convex lens, configured to focus the light beams generated by the photoelectric element 40 onto the end face of the optical fiber 51. The lens 62 is disposed in the lens holder 61. The optical axis of the lens 62 passes through the center of the lens 62, the end face of the optical fiber 51, and the photoelectric element 40. In other words, the end surface of the optical fiber 51 faces the center of the lens 62. In the embodiment, the photoelectric element 40 is an optical-signal transmitter, that emits light beams to pass through the lens 62 of the lens assembly 60 to arrive at or in the optical fiber 51 of the optical-fiber connector 50.

The transparent packaging material 70 covers the printed circuit board 10, the chips 30, the photoelectric element 40, the optical-fiber connector 50, and the lens assembly 60. In other words, the transparent packaging material 70 is infilled around and between the chips 30, the photoelectric element 40, the optical-fiber connector 50, and the lens assembly 60. Therefore, the chips 30, the photoelectric element 40, the optical-fiber connector 50, and the lens assembly 60 are embedded in the transparent packaging material 70 and are isolated from ambient air and moisture by the transparent packaging material 70. The transparent packaging material 70 may include epoxy resin, but it is not limited thereto. The transparent packaging material 70 can cover at least 70%, 80%, or 90% of the area of the top surface of the printed circuit board 10.

Therefore, the transparent packaging material 70 of the present disclosure provides moisture and dust protection for the chips 30, the photoelectric element 40, and the lens assembly 60, and other components on the printed circuit board 10, so as to improve the service life and signal reliability of the optical communication module 1. Moreover, the transparent packaging material 70 eliminates the need for the optical communication module 1 to be assembled in a vacuum, thereby reducing the manufacturing cost of the optical communication module 1.

The electromagnetic shielding layer 80 covers the transparent packaging material 70. In the embodiment, the electromagnetic shielding layer 80 further covers the rear surface of the insulated substrate 11, wherein the rear surface is opposite to the top surface of the insulated substrate 11. The electromagnetic shielding layer 80 may include a metal material, but it is not limited thereto. In the embodiment, the electromagnetic shielding layer 80 can be deposited on the outer surfaces of the transparent packaging material 70 and the insulated substrate 11 by metal sputtering. Therefore, electromagnetic protection is provided to the chips 30, the photoelectric element 40, and other components on the printed circuit board 10, and the manufacturing cost and the volume of the optical communication module 1 is reduced. In the embodiment, the electromagnetic shielding layer 80 covers at least 90% of the outer surface (the top surface and the side surface) of the transparent packaging material 70. The electromagnetic shielding layer 80 covers at least 90% of the area of the outer surface (the top surface and the side surface) of the insulated substrate 11.

Figure 3:
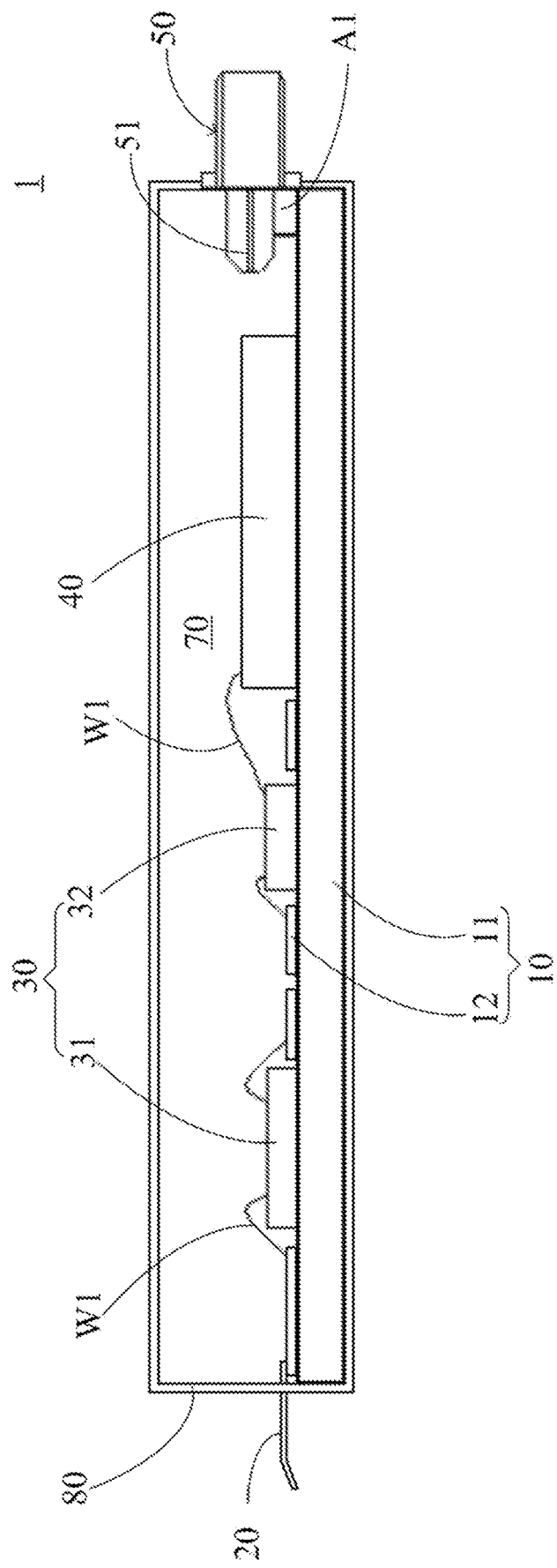
FIG. 3 is a schematic view of an optical communication module in accordance with a second embodiment of the present disclosure.

FIG. 3 is a schematic view of an optical communication module 1 in accordance with a second embodiment of the present disclosure. In the embodiment, the optical communication module 1 is an optical receiving module. In the second embodiment, the optical communication module 1 does not include the lens assembly 60. The end face of the optical fiber 51 faces the photoelectric element 40. The photoelectric element 40 is an optical-signal receiver, the light beam being emitted to the optical-signal receiver via the optical fiber 51. The control chip 31 drives the photoelectric element 40 to receive the light beam, and convert the optical signals of the light beam to the electrical signals. The electrical signals are transmitted to the electronic device via the signal wire 20. The monitor photodiode chip 32 detects the state of the light beam, such as power level.

In some embodiments, according to the first embodiment of FIG. 1 and the second embodiment of FIG. 3, the optical transmitting module and the optical receiving module can be integrated into an optical transceiver module, so that the optical communication module 1 has the functions of receiving and transmitting optical signals.

Figure 4:
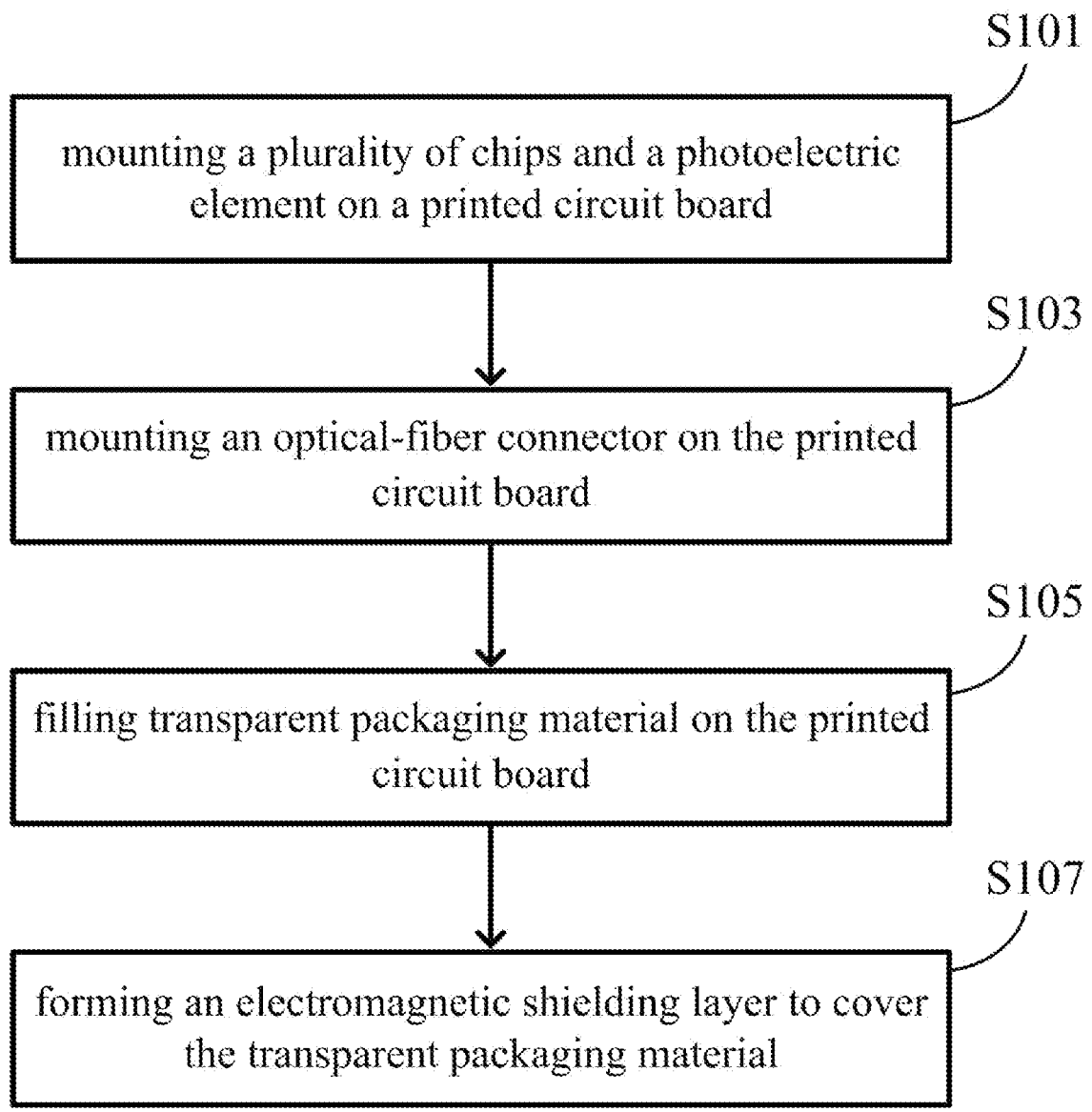
FIG. 4 is a flow chart of a method for manufacturing the optical communication module in accordance with embodiments of the present disclosure.

FIG. 4 is a flow chart of a method for manufacturing the optical communication module 1 in accordance with embodiments of the present disclosure. FIG. 5A to FIG. 5D show the intermediate stages of manufacture of the optical communication module 1. The first embodiment is taken as an example in FIGS. 5A to 5D. However, the manufacturing method of the optical communication module 1 can be applied to the second embodiment of FIG. 3 and the embodiment of the optical transceiver module.

Figure 5A:
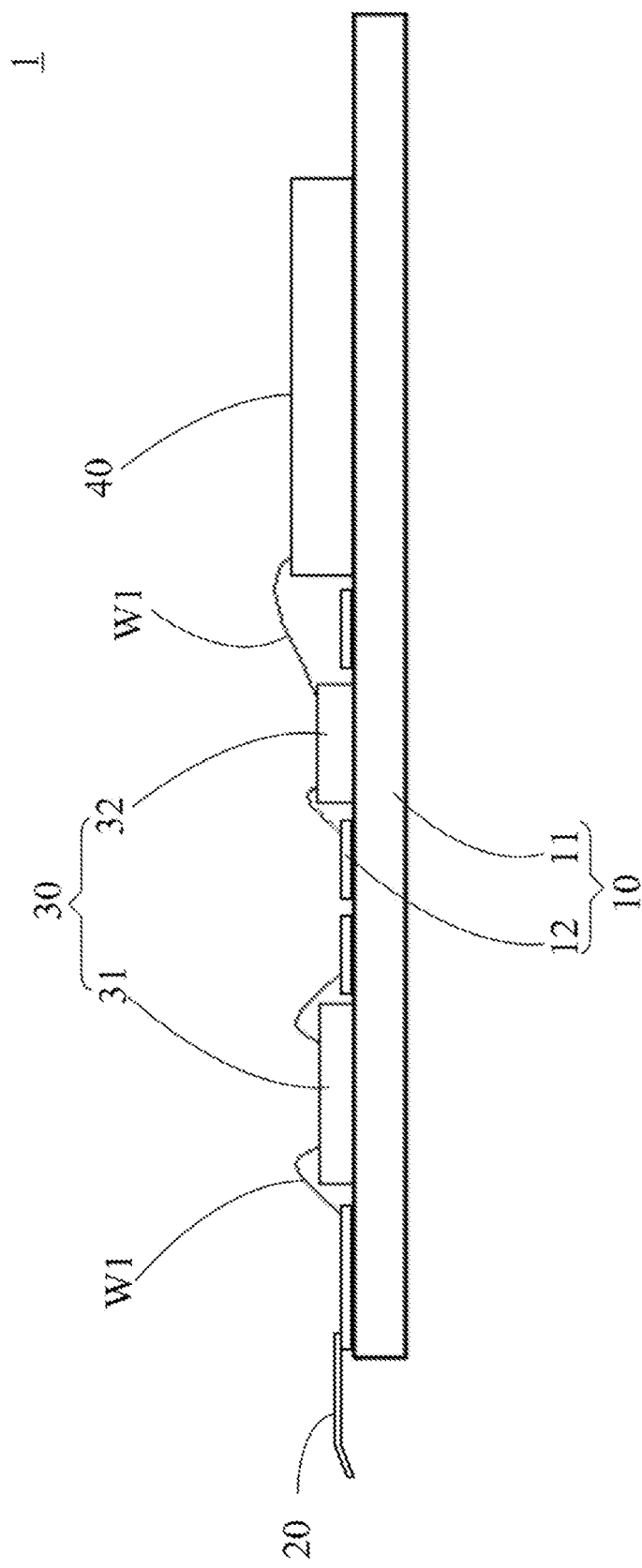
FIG. 5A to FIG. 5D show intermediate stages of manufacture of the optical communication module.

In step S101, as shown in FIG. 5A, the chips 30 and the photoelectric element 40 are mounted on the insulated substrate 11 of the printed circuit board 10 by chip on board (COB) packaging. The chips 30 and the photoelectric element 40 can be electrically connected to the circuit layer 12 of the printed circuit board 10 via the wire W1. Moreover, the signal wire 20 can be connected to the circuit layer 12 via soldering or the like.

Figure 5B:
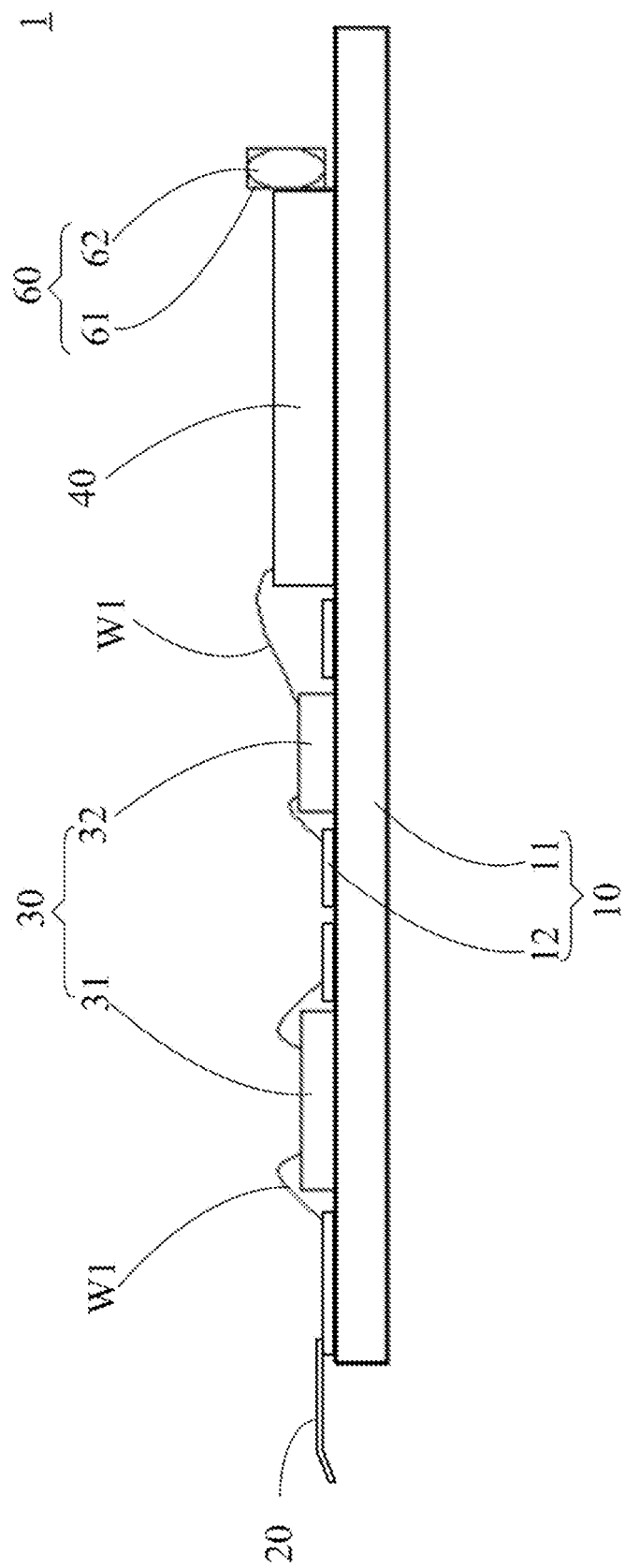

As shown in FIG. 5B, in the first embodiment, the photoelectric element 40 is an optical-signal transmitter, and the lens assembly 60 directly adheres to the luminous surface of photoelectric element 40 by glue. Therefore, the center of the lens 62 can be accurately adjusted to align with the center of the light beam on the luminous surface, which improves the reliability of optical signals. Moreover, since the lens 62 is in contact with or close to the luminous surface, the loss rate of a light beam can be reduced.

Figure 5C:
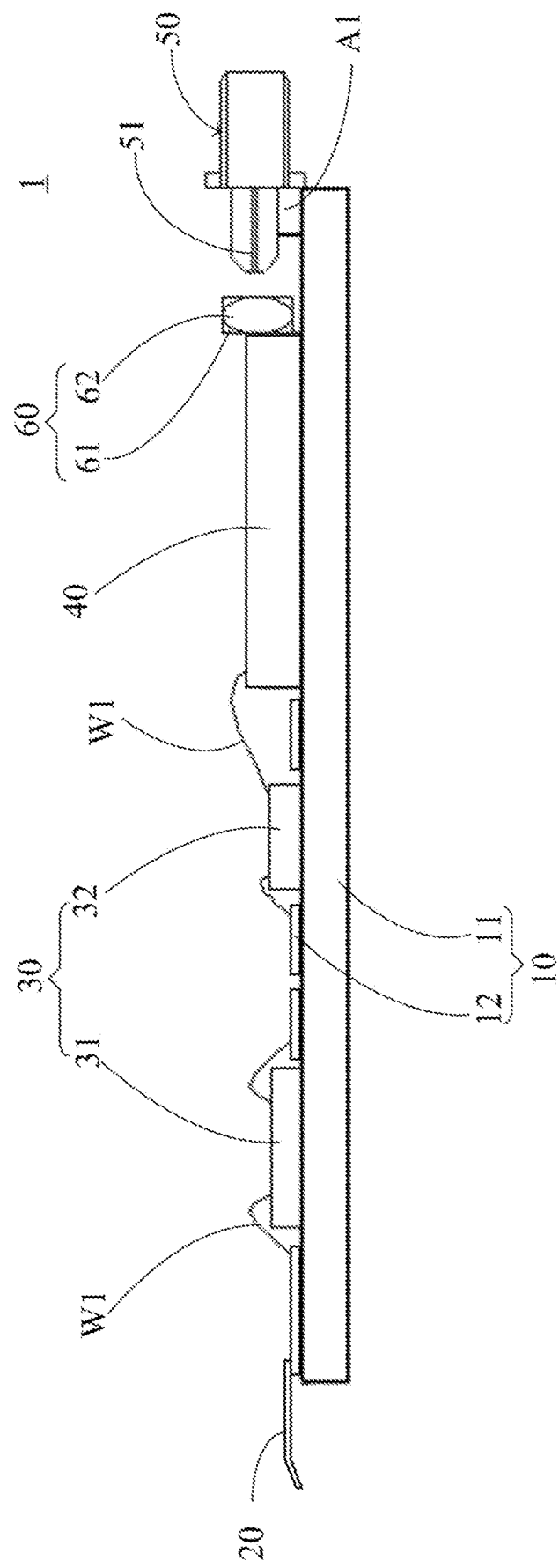

In step S103, as shown in FIG. 5C, the optical-fiber connector 50 is disposed on the printed circuit board 10. In some embodiments, the adjustable base A1 can be disposed on the insulated substrate 11 of the printed circuit board 10, and then the optical-fiber connector 50 is disposed on the adjustable base A1. The optical fiber 51 of the optical-fiber connector 50 can be aligned with the center of the lens 62 by the adjustable base A1. The position of the optical-fiber connector 50 relative to the printed circuit board 10 and the lens 62 can be maintained by the adjustable base A1.

Figure 5D:
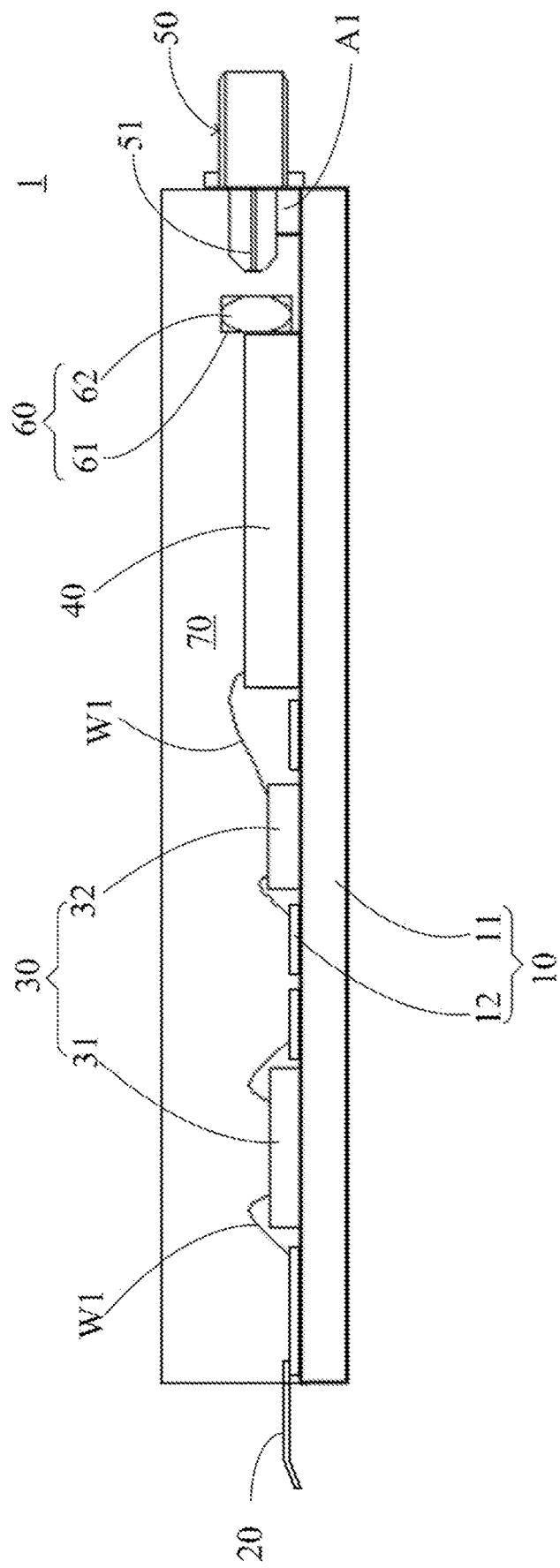

In step S105, as shown in FIG. 5D, the transparent packaging material 70 is infilled between and around the printed circuit board 10, the chips 30, the photoelectric element 40, the lens assembly 60, and the optical-fiber connector 50. In other words, the printed circuit board 10, the chips 30, the photoelectric element 40, the portion of the optical-fiber connector 50, and the lens assembly 60 are embedded in the transparent packaging material 70. Therefore, moisture and dust protection is provided by the transparent packaging material 70, so as to improve the service life and the signal reliability of optical communication module 1. Moreover, the present disclosure utilizes the transparent packaging material 70 to maintain the relative position between the optical-fiber connector 50 and the lens assembly 60, thereby simplifying the manufacture of the optical communication module 1.

In step S107, as shown in FIG. 1, the electromagnetic shielding layer 80 is deposited on the outer surfaces of the transparent packaging material 70 and the insulated substrate 11 by metal sputtering, thereby providing protection against electromagnetic interference to the chips 30 and the photoelectric element 40.

The transparent packaging material is utilized to provide moisture and dust protection to the elements mounted on the printed circuit board and to the optical communication module itself, so as to improve the service life and the signal reliability of the optical communication module. The manufacturing cost of the optical communication module is reduced. The transparent packaging material also fixes and maintains the position of the optical-fiber connector 50, so as to reduce the difficulty of manufacturing optical communication modules. In addition, the electromagnetic shielding layer provides protection against interference with the components on the printed circuit board, thereby reducing the manufacturing cost and volume of the optical communication module.

Many details of the optical communication module are often found in the art, and thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical communication module, comprising:
   a printed circuit board;
   a photoelectric element disposed on the printed circuit board;
   an optical-fiber connector disposed on the printed circuit board, and corresponding to the photoelectric element;
   an adjustment base disposed on the printed circuit board, wherein the optical-fiber connector is disposed on the adjustment base;
   a transparent packaging material covering the printed circuit board, the photoelectric element, and the optical-fiber connector; and
   an electromagnetic shielding layer covering the transparent packaging material.

2. The claimed optical communication module as claimed in claim 1, further comprising a lens assembly between the photoelectric element and the optical-fiber connector, wherein the photoelectric element is an optical-signal transmitter configured to emit a light beam to the optical-fiber connector via a lens of the lens assembly.

3. The claimed optical communication module as claimed in claim 2, wherein the optical-signal transmitter is a distributed feedback laser, and the lens assembly adheres to an luminous surface of the optical-signal transmitter.

4. The claimed optical communication module as claimed in claim 1, wherein the photoelectric element is an optical-signal receiver, and a light beam is emitted to the optical-signal receiver via an optical fiber of the optical-fiber connector.

5. The claimed optical communication module as claimed in claim 1, further comprising a plurality of chips disposed on the printed circuit board, wherein the printed circuit board comprises an insulated substrate and a circuit layer disposed on the insulated substrate, the insulated substrate is made of thermal conductive material, and the chip is electrically connected to the circuit layer via a wire.

6. The claimed optical communication module as claimed in claim 5, wherein the insulated substrate is a ceramic substrate.

7. The claimed optical communication module as claimed in claim 5, wherein the chips comprises a control chip and a monitor photodiode chip, the control chip is configured to drive the photoelectric element, and the monitor photodiode chip is configured to detect a light beam generated by the photoelectric element.

8. A manufacturing method of an optical communication module, comprising:

mounting a plurality of chips and a photoelectric element on a printed circuit board;

mounting a lens assembly on a side of the photoelectric element;

mounting an optical-fiber connector on the printed circuit board;

mounting an adjustment base between the printed circuit board and the optical-fiber connector, and an optical fiber of the optical-fiber connector is aligned with a center of a lens of the lens assembly by the adjustment base;

filling transparent packaging material on the printed circuit board, the chips, the photoelectric element and the optical-fiber connector; and forming an electromagnetic shielding layer to cover the transparent packaging material.

\* \* \* \* \*